Feb. 7, 1933. E. A. ROCKWELL ET AL 1,896,377
POWER BRAKE UNIT
Filed March 4, 1931 2 Sheets-Sheet 2
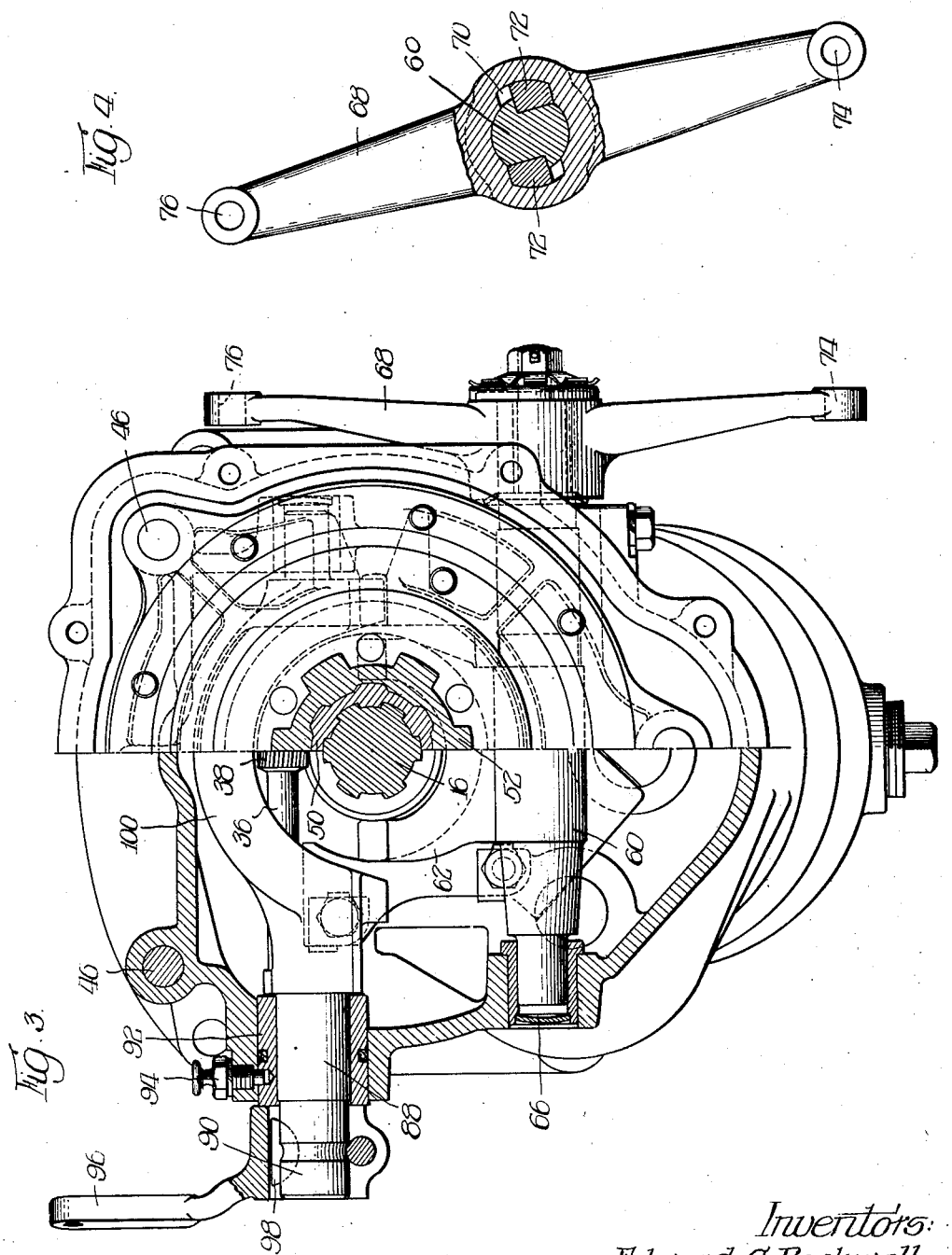
Inventors:
Edward A. Rockwell,
Marcel Garancher, Patented Feb. 7, 1933

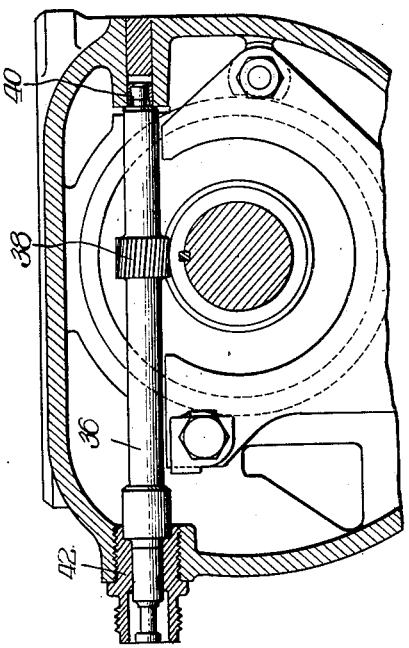
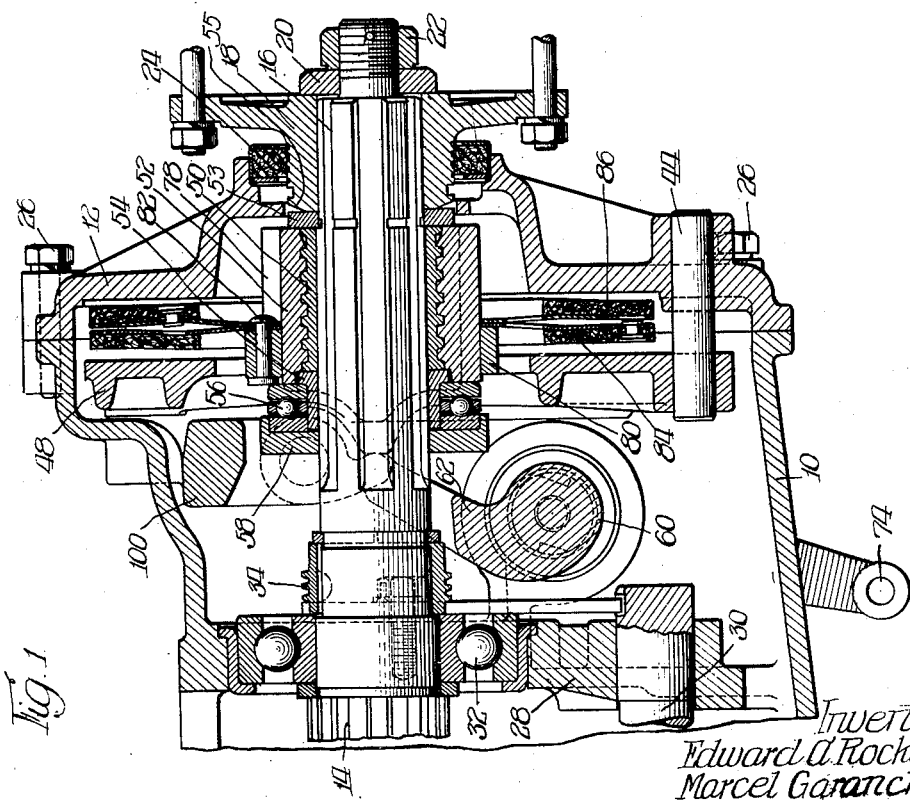

1,896,377

UNITED STATES PATENT OFFICE

EDWARD A. ROCKWELL AND MARCEL GARANCHER, OF CHICAGO, ILLINOIS

POWER BRAKE UNIT

Application filed March 4, 1931. Serial No. 519,999.

This invention relates to improvements in power brake constructions of the type used in association with the propeller shaft of a motor vehicle for amplifying the force applied to the brake pedal by the operator and transmitting the amplified braking force to the wheel brakes of the vehicle.

There has been previously disclosed in application Serial No. 421,707, filed January 18, 1930, by Edward A. Rockwell, a power brake construction, in which there is shown a power brake casing including an adapter plate for securement to the transmission casing of the vehicle; the power brake casing including a non-rotatable braking disc arranged to be yieldably driven from the shaft through a set of oppositely spiralled and relatively displaceable sleeves which constitute a portion of the output actuating means. According to this prior disclosure, the operator through suitable input linkage could apply a frictional retardation to the brake disc and the relative rotation of the brake disc with respect to the drive shaft would produce an axial displacement of the outer spiral sleeve in a direction to transmit through the output brake linkage a braking force to the wheel brakes of the vehicle.

It is an object of the present invention to provide a power brake device operable in either direction of rotation in which a single pair of sleeves spirally threaded together are employed, thereby avoiding the necessity of having oppositely spiralled members.

Thus, it is a feature of the present invention that the drive shaft has keyed thereto with provision for axial displacement, a sleeve exteriorly spiralled, which carries thereon a second sleeve interiorly spiralled and exteriorly keyed for axial displacement relative to a normally rotatable but retardable brake disc. The pair of sleeves are normally held in retracted position against abutment means. A retardation applied to the brake disc will produce in one direction of rotation and axial displacement of the outer spiral sleeve alone and in the other direction an axial displacement of the inner spiral sleeve alone. In both cases the output brake linkage is moved in a direction to apply the wheel brakes of the vehicle.

A further feature of the present invention consists in the compact arrangement of the parts with the brake disc carried upon the spiral sleeves instead of being offset with respect thereto as in the prior application referred to.

An additional feature of the construction consists in the design of the casing or housing for the power brake unit whereby the major portion of the casing is integral with the transmission casing with an end closure plate to permit assembly of the parts.

Further objects and advantages of the present invention will be more readily apparent from the detailed description taken in connection with the attached drawings, in which Figure 1 is a complete longitudinal vertical section taken through the power brake unit;

Figure 2 is a detail transverse vertical section illustrating the mounting of the speedometer drive shaft;

Figure 3 is a rear end view of the power brake device in broken section, and

Figure 4 is an end view of the output brake lever partially in section.

As shown in the drawings, the major portion of the casing for the power brake unit is made integral with the transmission casing and generally indicated 10. The casing is closed by an end plate 12. The drive shaft 14 extends from the transmission casing through the power brake unit. The drive shaft has longitudinal splines 16 which form a keyed connection with the drive sleeve 18 which constitutes a portion of the usual universal joint connection. The drive sleeve 18 is held in position by washer 20 and nut 22. The hub of the drive sleeve 18 is sealed against leakage of oil from the power brake casing by the oil seal unit 24. The end plate 12 is secured to the casing 10 by bolts 26. The transverse web 28 is provided in the casing 10 to form a support for a non-rotatable transmission shaft 30 (which forms a part of the usual transmission) and to form a bearing support for the ball bearing unit 32 supporting the drive shaft 14. A speedometer worm 34 is keyed to the drive shaft immediately in rear of the roller bearing unit 32.

As shown in the detail view of Figure 2, the casing 10 supports a speedometer drive shaft 36 having a gear 38 engaging the worm gear 34. The shaft 36 is supported by a bearing 40 at one end and by a removable bushing 42 at the other end.

At the lower portion of the end plate 12, on the vertical, center line, a fixed pin 44 is carried which, in cooperation with a pair of upper fixed pins 46 mounted in the casing 10, forms a support for the laterally movable non-rotatable brake plate 48.

The shaft 14 has keyed thereto an axially displaceable sleeve 50 having an exterior spiral thread coupling with an interior spiral thread of an outer sleeve 52. Both sleeves normally receive resilient pressure at their forward ends produced by the pull-back springs of the output brake linkage, as will be later described, and abut at their forward ends against a freely rotatable washer or thrust ring 53, which in turn bears laterally against the hub of the flanged drive sleeve 18. The end of the hub is chamfered, as indicated at 55, so that the contacting surface between the thrust ring and hub is equal to or less in diameter than the pitch line of the spiral thread. This feature is important since otherwise the friction produced might be sufficient to resist the reversible return of the sleeves to normal position after operative movement.

It will be understood that the sleeves rotate as a unit with the shaft until the outer sleeve is retarded whereupon, dependent upon the direction of rotation, the outer sleeve alone will be displaced in a forward direction or the inner sleeve alone will be displaced in the same direction. In each case, upon the release of the retarding pressure, the displaced sleeve will spin back to normal position under the influence of the lateral pressure applied to the forward end.

A ring 54 is carried by the shaft at the forward ends of the sleeves and in normal position holds the sleeves for rotation as a unit with the shaft 14. The ring 54 supports a thrust bearing 56 through which lateral movement produced by relative displacement between the sleeves is subjected to a thrust ring 58 of soft metal.

An output rock shaft 60 carried by the casing 10 beneath the shaft 14 and transverse thereto includes a yoke-shaped portion 62 having arms bearing in thrust engagement against the thrust ring 58. The output rock shaft 60 is supported at one end by the removable bearing bushing 64 closed by a sealing disc 66. The other end of the shaft protrudes from the casing 11 and has keyed thereto, with provision for lost motion, a double arm brake lever 68, as will be apparent from Figure 4. The hub of the lever 68 includes enlarged slots 70 which cooperate with abutment keys 72. Rotation of the rock shaft 60 in a clockwise direction, looking at Figure 4, serves to transmit rotative movement to the double arm brake lever in a direction to actuate the wheel brakes of the vehicle. A forwardly extending brake rod may be attached to the lower pivot 74 of the lever and a rearwardly extending brake rod may be attached to the upper pivot 76.

The outer spiral sleeve 52 has longitudinal exterior splines 78 thereon which form a connection with a hub 80 having secured thereto, by rivets 82, a pair of pressed metal brake discs 84 having secured to opposite sides thereof ring-shaped fabric discs 86.

At the upper portion of the casing an input rock shaft 88 is carried transverse to the drive shaft 14. The shaft 88 is supported at the end 90, which protrudes from the casing, by a removable bushing 92 held in position by bolt 94 engaging a slotted portion of the bushing. The protruding end 90 of the rock shaft has secured thereto an input brake lever 96 attached by a key 98. Within the power brake casing, the rock shaft 88 includes a yoke-shaped portion 100 extending over the shaft 14 having depending thrust arms bearing in thrust engagement against the movable brake plate 48.

The operation of the power brake device will be readily apparent. The shaft 14 drives the vehicle through the rear wheels in the usual manner. Rotation in one direction will tend to urge one of the sleeves 50 or 52 against the drive sleeve 18 and the other sleeve in a direction to exert pressure through the thrust bearing 56 to the output rock shaft 60. The output brake linkage, which is connected to the arms of the brake lever 68, includes the usual pull-back springs for holding the brake linkage in released position so that the sleeves 50 and 52 will be held against relative axial displacement and will rotate as a unit with the drive shaft 14. The brake disks will be similarly rotated at the same speed as the drive shaft 14. The operator, through suitable input linkage may produce a rocking movement of the input rock shaft 88, thereby transmitting lateral pressure to the movable brake plate 48 in a direction to compress the rotatable brake discs between the non-rotatable brake plate 48 and the fixed end plate of the casing 12. The frictional retardation applied to the brake discs will tend to retard the rotation of the sleeve 52 and one of the sleeves 50 or 52 will be moved in an axial direction to produce movement of the output rock shaft 60 and thereby transmit pressure to the output brake linkage to apply the wheel brakes of the vehicle.

In one direction of rotation of the shaft 14, the inner sleeve 50 will continue to rotate with the shaft 14 while the outer sleeve 52 will be retarded and will be axially displaced relative to the drive shaft 14 and relative to the brake discs. In the other direction of rotation, the outer sleeve 52 will be retarded in its rotation relative to the drive shaft 14, but will not receive an axial displacement, instead, the inner sleeve 50 alone will be axially displaced in a direction to transmit pressure to the thrust bearing and the output rock shaft.

The preferred embodiment as disclosed is compact and easy to assemble. The feature of mounting the rotatable braking member directly upon the spiral sleeve is highly desirable. However, various changes and modifications may be resorted to without departing from the spirit of the invention as expressed in the appended claims.

Having thus described the invention what is claimed as new and desired to be secured by United States Letters Patent is:

1. In a power brake unit a drive shaft, a pair of sleeves spirally threaded together mounted concentric with said drive shaft, the inner sleeve being keyed for rotation with the drive shaft but capable of axial displacement relative thereto, abutment means limiting the axial displacement of said sleeves in one direction, movable output means opposing the axial displacement of said sleeves in the other direction and input means for retarding the normal rotation of the outer sleeve in either direction of its rotation whereby one of the sleeves will be urged against said abutment means and the other sleeve will be axially displaced in a direction to transmit movement to the output means.

2. In a power brake unit, a drive shaft, a sleeve keyed thereto for rotation therewith and for axial displacement relative thereto, said sleeve having an exterior spiral thread, a second sleeve having an inner spiral thread coupled to said first sleeve, a normally rotatable but retardable braking member keyed to said second sleeve with provision for relative axial displacement, abutment means serving to limit the axial displacement of either of said sleeves in one direction, output means initially opposing axial displacement of either of said sleeves in the opposite direction and input means for frictionally retarding the rotation of said braking member in either direction of its rotation whereby one of said sleeves will be moved in a direction to transmit movement to the output means.

3. A power brake mechanism for motor vehicles comprising a transmission drive shaft, an exteriorly spiralled sleeve keyed to said drive shaft for axial displacement relative thereto, a drive sleeve keyed to the end of said drive shaft forming an abutment to limit the travel of said spiral sleeve in a rearward direction, a second sleeve interiorly spiralled coupled with said first sleeve, said drive sleeve forming an abutment to limit the rearward travel of said second sleeve, axially displaceable thrust bearing means carried by said shaft forming an abutment to limit the forward travel of said sleeves, output means moved in an actuating direction by the displacement of said thrust bearing means in a forward direction and input means for retarding the normal rotation of said second sleeve to produce an axial displacement in a forward direction of one of said sleeve and actuating movement of said output means.

4. In a motor vehicle, a transmission casing having an integral rearward extension forming a housing for a power brake unit, a drive shaft extending from said transmission casing through said power brake housing, a flanged drive sleeve keyed to the end of said drive shaft which protrudes from the power brake housing, a rear end cover plate for said power brake housing, sealing means between said cover plate and the hub of said flanged drive sleeve, a non-rotatable laterally movable pressure applying plate within said power brake housing, a normally rotatable but retardable braking member carried by said shaft for rotation between said pressure plate and said end plate, axially displaceable thrust means mounted concentric with said shaft movable upon relative rotation between said brake member and said shaft in either direction of rotation, input means for producing lateral movement of said pressure plate to produce a frictional retardation of said brake member and output means moved by the displacement of said thrust means.

5. In a power brake, a drive shaft, a normally rotatable but retardable braking member mounted concentric with respect to said drive shaft, yieldable coupling means between said braking member and said shaft comprising a pair of sleeves spirally threaded together, each of said sleeves being axially displaceable relative to said shaft and said braking member, abutment means adapted for engagement by the opposite ends of said sleeves, and relatively displaceable with respect to each other in an axial direction, input means for producing frictional retardation of said braking member and output means moved by the relative axial displacement between the abutment means at the opposite ends of said sleeves.

6. In a power brake unit, a drive shaft, a displaceable spiral sleeve keyed thereto for rotation therewith, a second spiral sleeve threaded on said first sleeve, an abutment member fixed to said shaft having a lateral bearing face of smaller diameter than the outside diameter of said first sleeve, a thrust member between said sleeves and said abutment forming a stop for both of said sleeves, yieldable output means applying lateral pressure to the other ends of said sleeves to urge said sleeves against said abutment and means for retarding the rotation of said outer sleeve to produce, in either direction of rotation, a lateral displacement of one of said sleeves away from said abutment.

7. Power brake mechanism for motor vehicles comprising an integral transmission and power brake casing, an internal web supporting the transmission shafts and a bearing for the drive shaft, an end cover plate for the casing forming a stationary braking surface, a laterally movable non-rotatable brake plate within the casing, pins extending from said end plate supporting said brake plate and a normally rotatable but retardable braking member between said movable brake plate and said end plate.

8. In a power amplification unit, a pair of concentric spiral sleeves in threaded engagement, abutment means for preventing movement of either of said sleeves axially in one direction from normal position, output means moved by the axial displacement of either of said sleeves in a direction away from said abutment means, means for rotating one of said sleeves and input means for retarding the rotation of the other of said sleeves to produce a relative axial displacement between said sleeves and to transmit movement to said output means.

9. In a power amplification unit, a drive shaft, a pair of concentric spiral sleeves in threaded engagement, one of said sleeves being keyed for rotation with said drive shaft, input means for retarding the rotation of the other of said spiral sleeves, abutment means for preventing axial displacement of either of said sleeves in one direction from normal position and output means moved by an axial displacement of either of said sleeves in a direction away from said abutment means, whereby operation of said input means causes a relative axial displacement between said sleeves and transmits movement to said output means.

10. In a power amplification unit, a drive shaft, a sleeve having an exterior spiral thread slidably keyed to said drive shaft, a second sleeve having an interior spiral thread in threaded engagement with said first sleeve, a braking element slidably keyed for rotation with said second sleeve, input means for producing frictional retardation of said braking element, abutment means for preventing axial displacement of either of said sleeves in one direction from normal position and output means operative by an axial displacement of either of said sleeves in a direction away from said abutment means.

Signed at Chicago, Illinois, this 24th day of February, 1931.

EDWARD A. ROCKWELL.
MARCEL GARANCHER.